(12) United States Patent
Neese et al.

(10) Patent No.: US 6,398,342 B1
(45) Date of Patent: Jun. 4, 2002

(54) OPEN JET COMPENSATION DURING MULTI-PASS PRINTING

(75) Inventors: David A. Neese, Escondido; Warren Free, Anaheim; Loan M. Hoang, San Diego, all of CA (US)

(73) Assignee: Encad, Inc., San Diego, CA (US)

( * ) Notice: Subject to any disclaimer, the term of this patent is extended or adjusted under 35 U.S.C. 154(b) by 0 days.

(21) Appl. No.: 09/929,196

(22) Filed: Aug. 13, 2001

Related U.S. Application Data

(63) Continuation of application No. 09/127,397, filed on Jul. 31, 1998.
(60) Provisional application No. 60/055,080, filed on Aug. 1, 1997.

(51) Int. Cl.⁷ .............................. B41J 2/145; B41J 2/15
(52) U.S. Cl. .......................................... 347/40; 347/41
(58) Field of Search ............................... 347/40, 41, 19

(56) References Cited

U.S. PATENT DOCUMENTS

| | | | |
|---|---|---|---|
| 4,748,453 A | 5/1988 | Lin et al. | 347/41 |
| 4,963,882 A * | 10/1990 | Hickman | 347/41 |
| 4,965,593 A | 10/1990 | Hickman | 347/12 |
| 4,967,203 A | 10/1990 | Doan et al. | 347/41 |
| 4,999,646 A | 3/1991 | Trask | 347/41 |
| 5,124,720 A | 6/1992 | Schantz | 347/19 |
| 6,168,261 B1 * | 1/2001 | Miyake et al. | 347/40 |

FOREIGN PATENT DOCUMENTS

| | | |
|---|---|---|
| EP | 0 394 699 A1 | 3/1990 |
| EP | 0 694 396 A2 | 1/1996 |
| EP | 0 855 270 A2 | 7/1998 |
| EP | 0 863 004 A2 | 9/1998 |
| JP | 63-067164 | 3/1988 |
| JP | 3-259755 | 11/1991 |
| JP | 7-28525 | 10/1995 |
| WO | WO 96/32263 | 10/1996 |
| WO | WO 98/40222 | 9/1998 |

\* cited by examiner

*Primary Examiner*—Thinh Nguyen
(74) *Attorney, Agent, or Firm*—Knobbe Martens Olson & Bear LLP

(57) ABSTRACT

A method and system for compensating for nonfunctional ink jets in an ink jet printer. The ink-jet printer includes a printhead having a plurality of ink jets, each ink jet being assigned to print respective dots on a respective raster line of a recording medium in accordance with a print mask, wherein when an ink jet is detected as being defective, at least a portion of said print mask is replaced with a replacement mask such that one or more of the remaining ink jets of the plurality of ink jets compensates for the defective ink jet. The method includes: detecting when an ink jet is nonfunctional; and when an ink jet is determined to be nonfunctional, replacing at least a portion of the print mask with a replacement mask such that one or more of the remaining ink jets of the plurality of ink jets compensates for the nonfunctional ink jet.

3 Claims, 19 Drawing Sheets

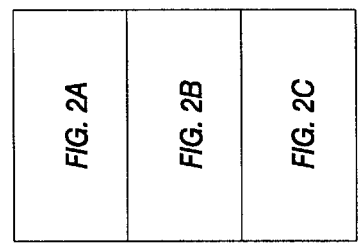
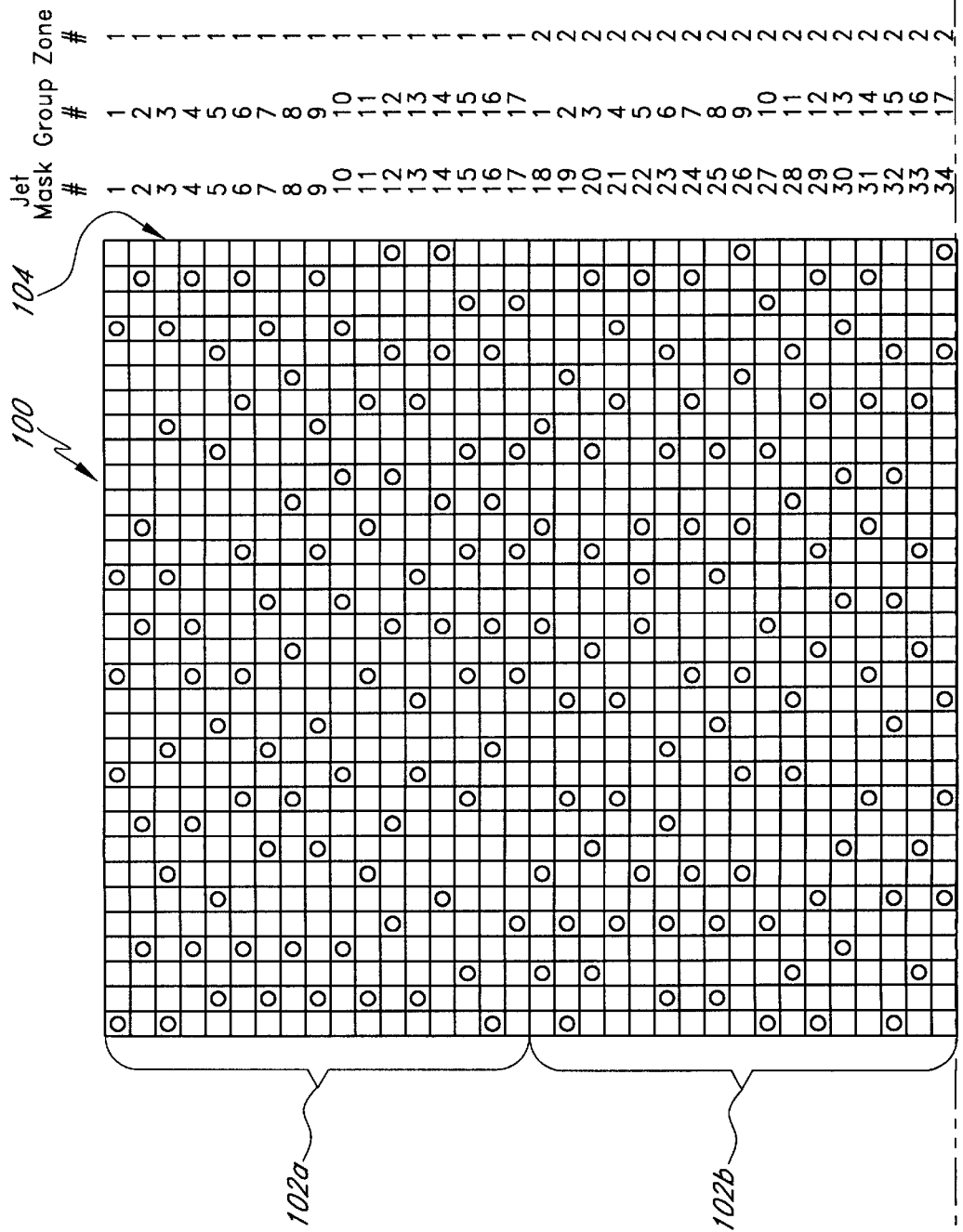
FIG. 2A

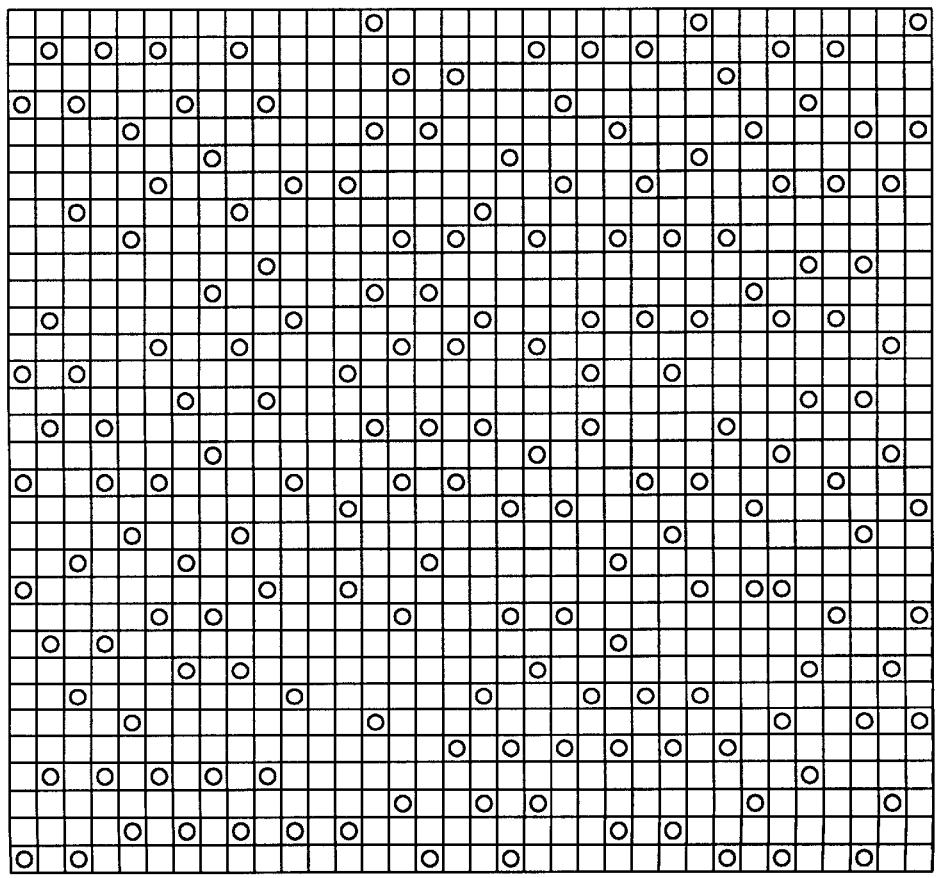

FIG. 11C

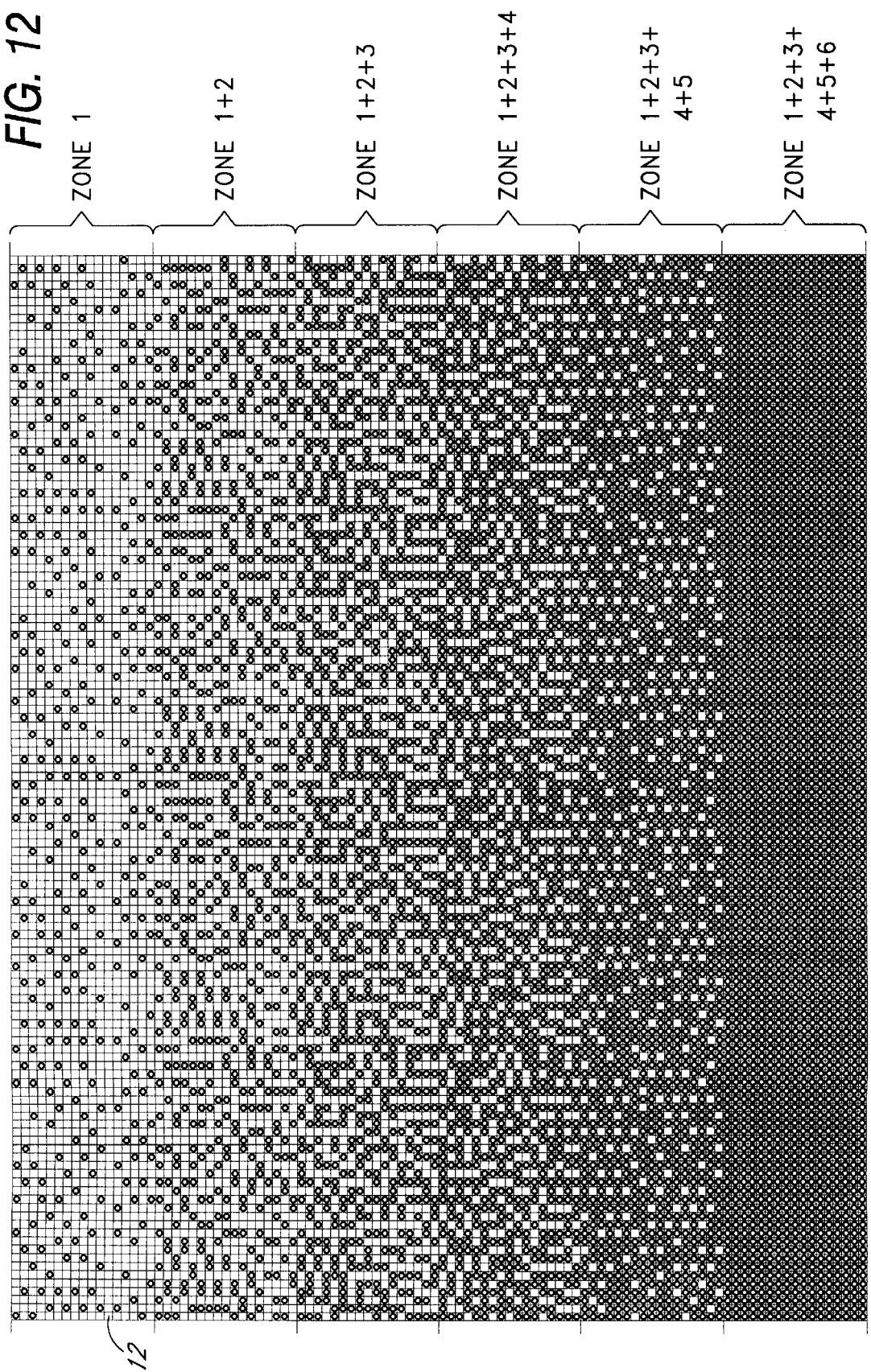

OPEN JET COMPENSATION DURING MULTI-PASS PRINTING

RELATED APPLICATIONS

This application is a continuation of U.S. patent application 09/127,397 entitled "OPEN JET COMPENSATION DURING MULTI-PASS PRINTING" and filed on Jul. 31, 1998, now U.S. Pat. No. 6,302,511, which claims priority to a U.S. provisional application entitled, "Open Jet Compensation During Multi-Pass Printing," U.S. Application Serial No. 60/055,080, filed on Aug. 1, 1997.

BACKGROUND OF THE INVENTION

1. Field of the Invention

The invention relates to multi-pass ink-jet printing. More particularly, the invention relates to a method and system for detecting one or more failed ink jets and thereafter compensating for the one or more failed ink jets with the remaining operational ink jets.

2. Description of the Related Technology

Multi-pass printing is a technique used to reduce banding in ink-jet printing. Dots of ink, when still in liquid form, tend to run together due to surface tension. This is referred to as coalescence. To print a high quality image it is important to print individual round dots. But to achieve fall saturated colors, the dots must overlap to completely cover the paper. By only printing a portion of the image data so as to avoid simultaneously printing adjacent dots during each printing cycle, coalescence may be largely avoided. Additionally, by avoiding all horizontal adjacencies, the transverse speed of the printing mechanism can be increased up to two times the rated print speed of the printhead.

Multi-pass printing is accomplished by filtering the image data using a print mask to determine which dots are to be printed in each swath. A swath is defined as a region, or portion, of a recording medium which is printed upon by a given portion, or print zone, of a printhead cartridge having a specified number of ink jets, as the printhead cartridge passes over the recording medium. The swath successively advances through each print zone after each pass of the printhead and is partially printed in each print zone. The printing of a swath is completed after it has successively advanced through each print zone.

In multi-pass printing, each jet of a printhead is assigned the role of ejecting ink, as necessary, onto pre-specified areas or "dots" on a raster line which is currently in the jet's respective print zone. However, a jet sometimes fails either due to being clogged or electrical problems in its firing circuitry. When this occurs, the pre-specified areas which are assigned to the failed jet in accordance with a respective jet mask, are not printed upon. Therefore, if one or more jets fail and there are many areas in which intended ink drops are not deposited, the quality of the printed image may significantly suffer.

Prior art methods have dealt with this problem by utilizing auxiliary jets in the printhead which are assigned the task of replacing failed jets. However, this method is inefficient because these auxiliary jets are inactive during periods when there are no jet failures. Therefore, the auxiliary jets represent printhead resources which are not filly utilized to their maximum potential. Additionally, in order to safeguard against situations in which multiple jets simultaneously fail, not just one but a bank of multiple auxiliary jets are set aside in the printhead for taking the place of failed jets. Although printheads having multiple auxiliary printheads improve the reliability and quality of the images produced by the printer, these printheads are more costly, larger and, therefore, require more space in a printer than those printheads without auxiliary jets.

SUMMARY OF THE INVENTION

In one embodiment of the invention, an ink-jet printer comprises a printhead having a plurality of print zones, wherein each print zone has a plurality of ink jets such that each ink jet is configured to print dots on a recording medium in accordance with a print mask. The plurality of ink jets comprises a plurality of jet groups such that each jet group has at least one ink jet corresponding to each print zone, wherein each jet group is responsible for printing dots on a respective raster line of the recording medium. When an ink jet in a jet group is detected as being non-functional, at least a portion of the print mask is replaced with a replacement print mask such that one or more of the remaining ink jets in that jet group compensates for the non-functional ink jet, wherein the replacement print mask avoids the simultaneous printing of horizontally adjacent dots on the respective raster line.

BRIEF DESCRIPTION OF THE DRAWINGS

FIG. 12 illustrates the printing configuration of successive swaths of a recording medium as the recording medium successively passes through the six print zones of the printhead of FIG. 2 when using the print mask of FIG. 11.

DETAILED DESCRIPTION OF THE PREFERRED EMBODIMENT

The invention is described in detail below with reference to the figures.

Figure 1:
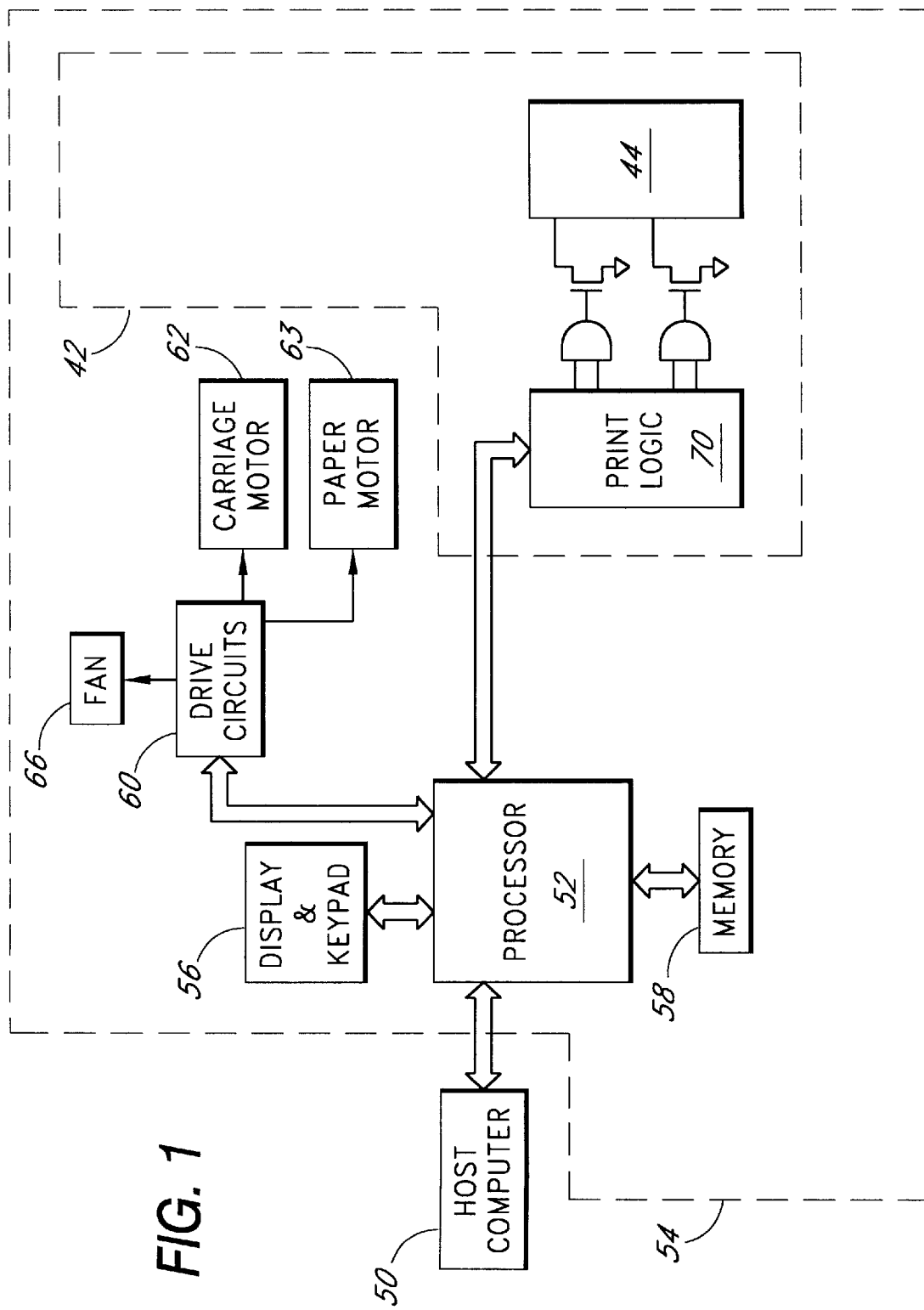
FIG. 1 is a block diagram of the components of an ink jet printer system.

Referring to FIG. 1, various components of a typical inkjet printer 54, having a host computer 50 coupled thereto, is illustrated. These various components include control electronics of the inkjet printer 54 which are used to control ink droplet ejection from the ink jets of a printhead cartridge 44 of a printhead carriage 42. A host computer 51 communicates with a processor 52 integral with the ink jet printer 54. The host computer 51 runs driver software which issues print commands and sends data to the ink jet printer. As in conventional ink jet printers, the processor 52 communicates with a display and keypad 56, memory 58, and drive circuits 60 which control the print carriage motor 62 and paper motor 63 as well as powering a fan 66. In addition, the processor 52 routes signals to print logic 70, which actuates the ink jet nozzles of the ink jet printhead 44. As used herein, the terms "printhead", "cartridge" and "printhead cartridge" are use synonymously and interchangeably.

The processor 52, in accordance with internal firmware stored in a portion of the memory 58, selectively ejects ink droplets from the nozzles of the ink jet print head of each cartridge. The programming of the processor thus determines which nozzle of the print head is assigned to be used to eject an ink droplet onto any given grid location of the printed image when the relevant swath being printed calls for a droplet at that given grid location. In multi-pass printing, the set of nozzle to grid location assignments is commonly referred to as a print mask, and the print mask definition is stored in memory 58 in the ink jet printer. The function and operation of a print mask is described in further detail below with reference to FIGS. 2–15.

Figure 2B:
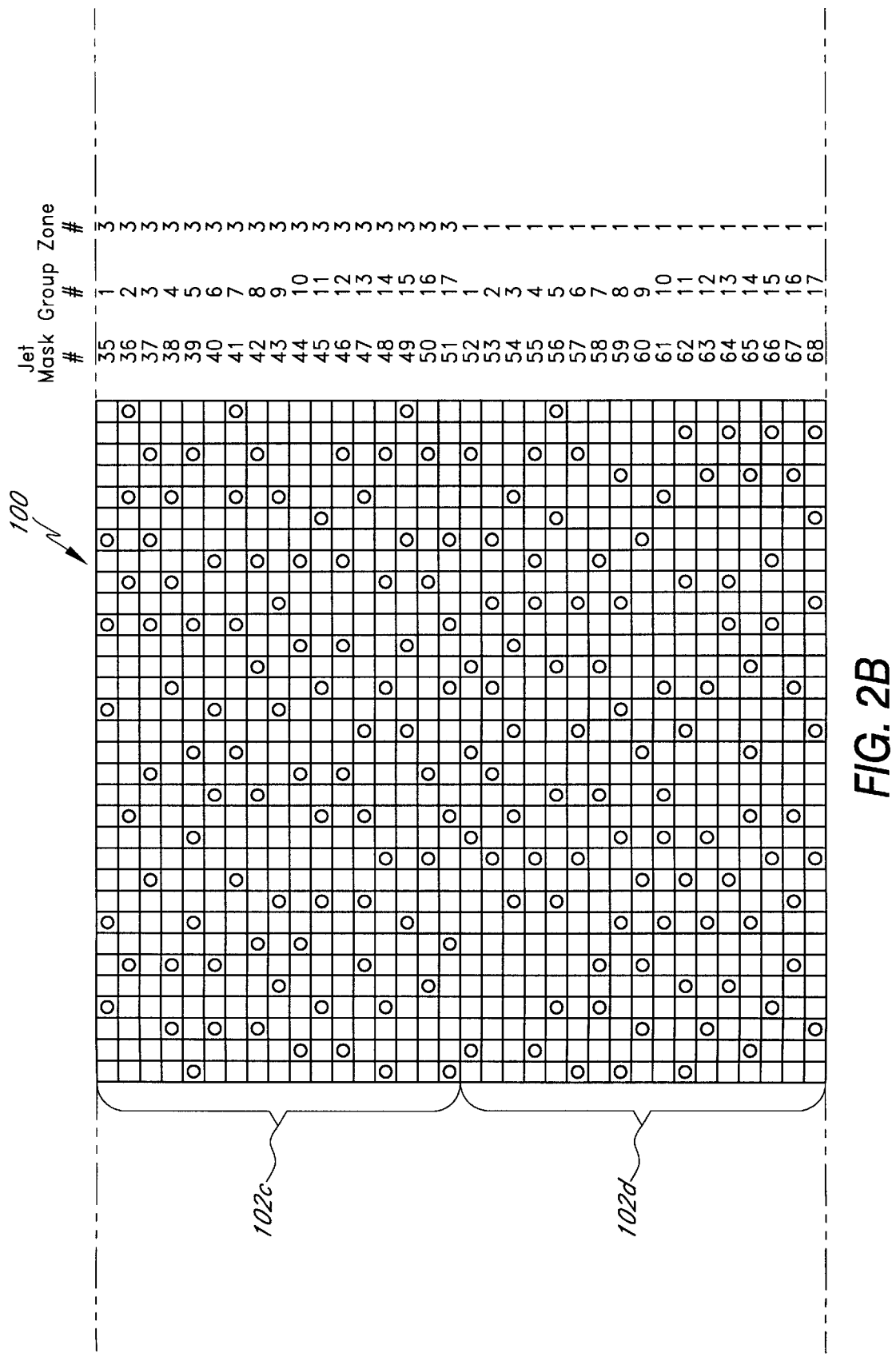
FIG. 2 illustrates a portion of a print mask for a 104 jet printhead having six print zones corresponding to a six-pass multi-pass printing configuration.
Figure 2C:
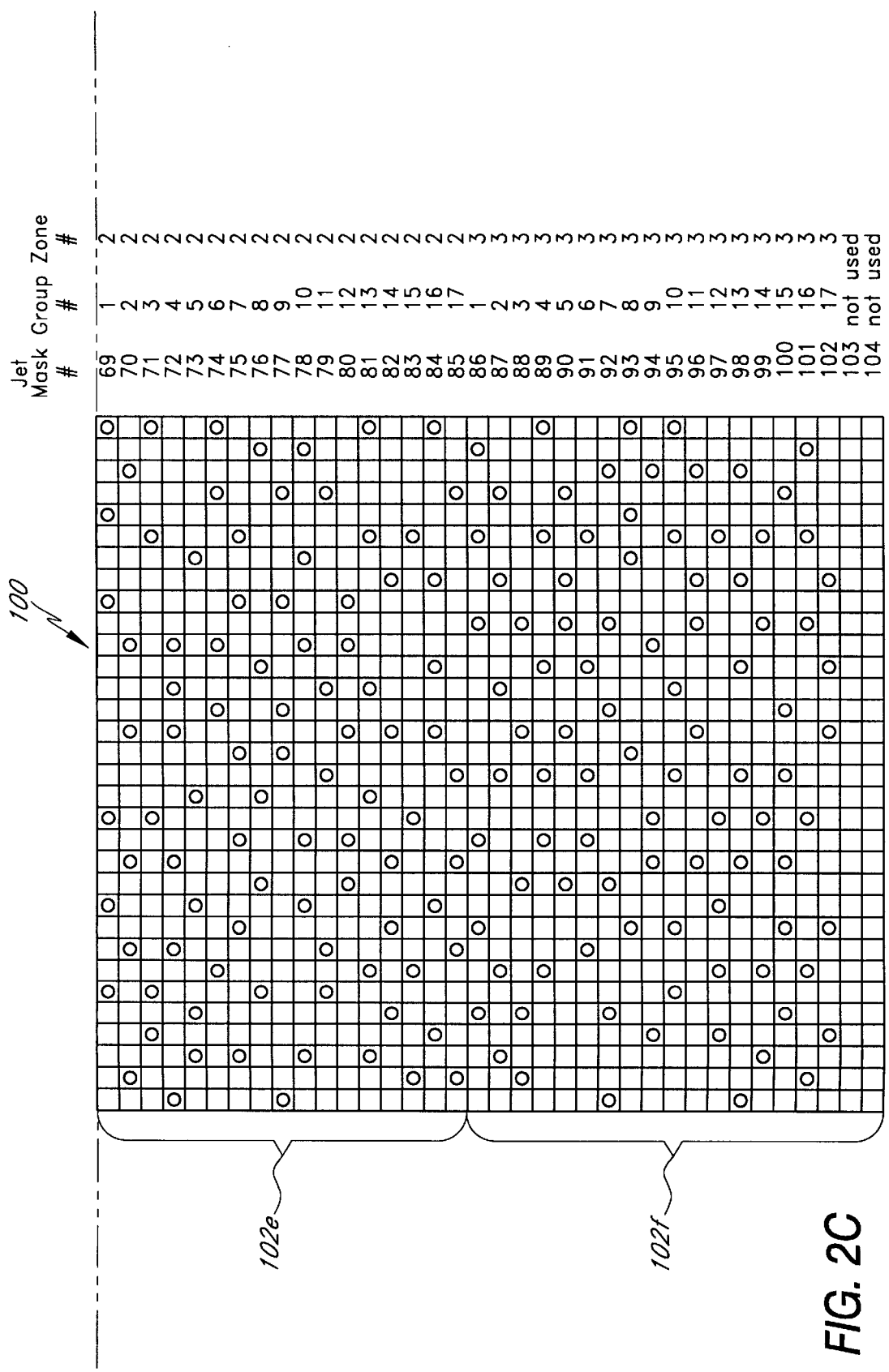

Referring to FIG. 2, one example of a print mask 100 having six print zones 102*a–f*, and 17 individual jet masks 104 within each print zone 102*a–f* (for a total of 102 individual jet masks 104), is illustrated. A separate print mask 100 is defined for each print-mode (number of passes) supported by the device and is used, unchanged, throughout the processing and printing of an image. The print mask 100 is made up of the individual jet masks 104 that determine the dots fired by each jet of a printhead. These individual jet masks 104 are configured such that adjacent jets on the printhead do not print horizontally or vertically adjacent dots during a single pass of the printhead across the recording medium. As described above, by avoiding horizontal and vertical adjacencies, printing anomalies and distortions caused by the coalescence of adjacent dots are substantially reduced.

Figure 4:
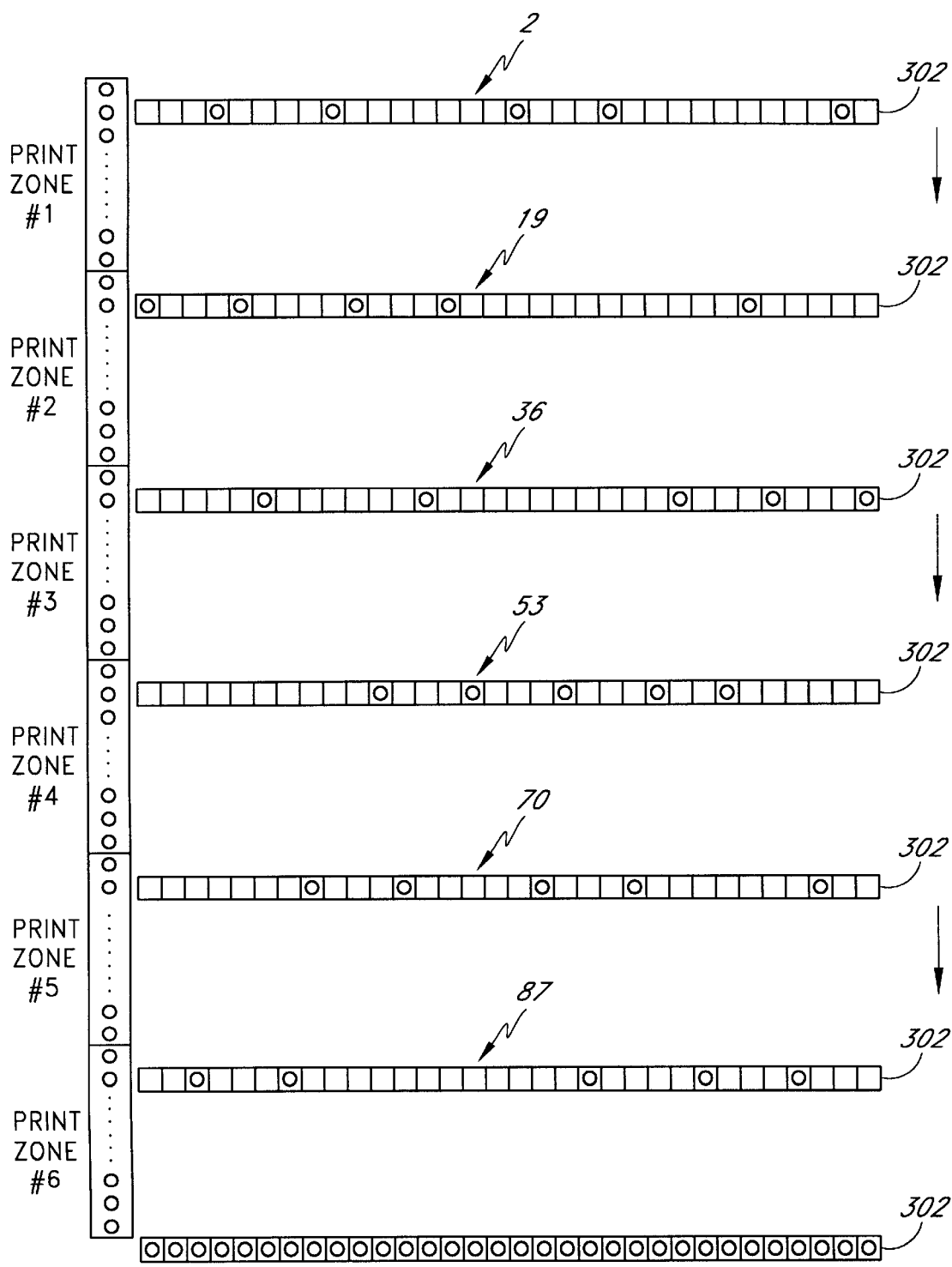
FIG. 4 illustrates the dots on the raster line which are printed in each print zone in accordance with the six jet masks of jet group #2 of FIG. 3, as the raster line on the recording medium is successively advanced through each print zone.

As shown in FIG. 2, the individual jet masks 104 are arranged into zones 102*a–f* that correspond to the number of passes for which that print mask was designed. A set of a jets having one jet from each zone makes up a complementary jet group. Jet masks for each jet in a jet group make up a jet group mask. For example, jet mask no.'s 2, 19, 36, 53, 70 and 87 make up jet group mask no. 2. FIG. 4 illustrates one embodiment of jet group mask no. 2 which includes the six jet masks 2, 19, 36, 53, 70 and 87. These six jet masks 2, 19, 36, 53, 70 and 87 correspond to the six print zones 1, 2, 3, 4, 5 and 6, respectively.

During printing, each print zone 102*a–f* prints a swath of the recording medium. Referring again to FIG. 2, a swath may be defined as the set of seventeen vertically adjacent raster lines on the recording medium within each respective print zone. However, it is understood that the invention is not limited by any specific number of raster lines in a swath or jet masks in a given print zone. Different embodiments are envisioned which contain different numbers of raster lines per swath and/or jet masks per print zone.

Figure 3:
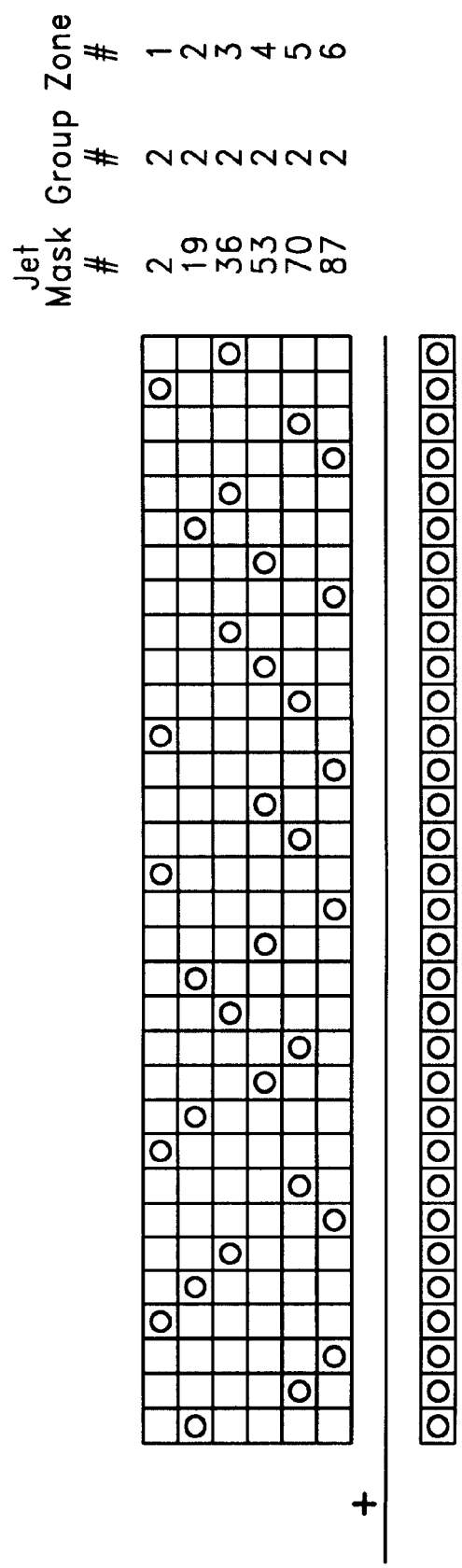
FIG. 3 illustrates six jet masks corresponding to jet group #2 of the print mask of FIG. 2, each jet mask corresponding to a respective jet and a respective print zone.

Referring to FIG. 4, each jet mask 2, 19, 36, 53, 70 and 87 of the jet group mask of FIG. 3 is illustrated within its corresponding print zone 1–6. Each raster line in a swath is printed by a single jet group with the work being shared between the members of that jet group. For example, during a first pass of the printhead over the recording medium, a swath of the recording medium is in print zone #1 and the second jet of the printhead belonging to jet group 2, prints dots on a corresponding second raster line 302 of the swath in accordance with jet mask 2 of FIG. 3. FIG. 4 further illustrates the allocation of dots on a single raster line 302 in accordance with jet masks 2, 19, 36, 53, 70 and 87 of jet group mask 2, as the single raster line 302 advances through each print zone 1–6. As shown in FIG. 4, jet mask 2 indicates which dots on the second raster line that jet 2 is responsible for printing. If the image requires ink to be printed on a dot for which the second jet is responsible for, this dot is printed during the first pass of the printhead over the swath when it is in print zone 1.

After printing the swath in print zone 1, the recording media is advanced by an amount equal to the size of one zone such that the swath is now in print zone 2. When the swath is in print zone 2, the second raster line 302 is aligned with a jet of the printhead which is a member of jet group 2. In print zone 2, the second raster line 302, which has been partially printed upon by the second jet when it was in print zone 1, is now printed upon, as necessary, by the nineteenth jet of the printhead during a second pass of the printhead over the recording medium. As discussed above, the nineteenth jet and its corresponding jet mask 19 is the next member of jet group 2 which is responsible for printing the second raster line 302 in the swath. Jet mask 19 allocates which dots are printed by the nineteenth jet.

After printing the swath in print zone 2, the recording media is once again advanced by an amount equal to the size of one zone such that the swath is now in print zone 3. In print zone 3, the second raster line 302 is aligned with a 36th jet of the printhead and is printed upon, as necessary, by the 36th jet in accordance with jet mask 36, during a third pass of the printhead over the recording medium.

The above-described process is repeated until the swath has been printed upon in each print zone. As shown in FIG. 3, after the swath has completed the six-pass printing process and advanced through each of the six print zones, all the dots of the raster line 302 are accounted for. As used herein, the term "dot" refers to any area of any shape or size on a recording medium, which may be covered by ink by a jet.

Figure 5:
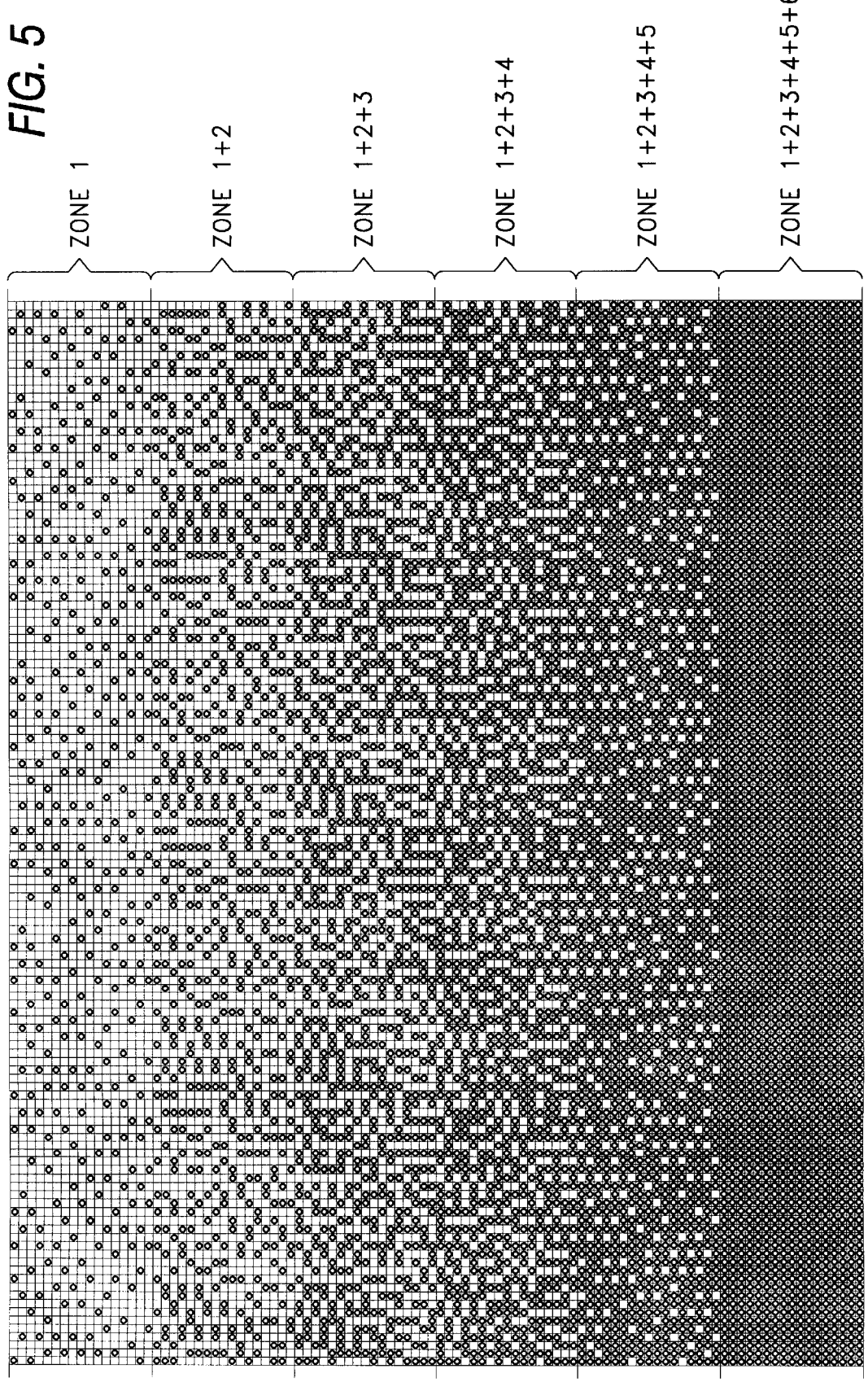
FIG. 5 illustrates the printing configuration of successive swaths of a recording medium as the recording medium successively passes through the six print zones of the printhead of FIG. 2 when using the print mask of FIG. 2.

FIG. 5 illustrates adjacent swaths of a recording medium which have undergone various stages of a six-pass (hence, six zone) printing process. The configuration of dots on the recording medium represents all the dots which may be printed in a given zone plus all previous zones. In the example shown, the image to be printed on the recording medium is a solid image, otherwise known as a "color fill," covering the entire printable surface area. As shown in FIG. 5, each dot is within a square box which represents the area on the recording medium which is intended to be covered by the dot of ink. However, it is understood that these square boxes are illustrated merely for purposes of distinguishing the different areas or "dots" on the recording medium and are not visible on the actual recording medium. It is further understood, that the dots printed on the recording medium may have overlapping areas such that there are no spaces between adjacent dots if a solid image, or full "color-fill" is desired.

Open jet compensation is a modification to the multi-pass printing method described above, which allows for the use of information regarding defective or non-functional jets to dynamically modify the print masks of a printhead to compensate for the non-functional jets. This type of compensation scheme typically results in minimal degradation in print quality and no degradation in printing speed when there are relatively few defective jets in each jet group. Although the following discussion focuses on a printhead configured for six-pass mode printing in six print zones, and having seventeen jet groups, each jet group having one jet in each print zone, it is understood that the invention may be implemented in printers having printheads with different numbers of print zones, jet groups and jets in each jet group.

If a jet group contains defective jets, the jet masks for the entire group are replaced with a replacement jet group mask that is appropriate for the number of functional jets remaining in that group. In one embodiment, the maximum number of jets in a jet group is 6. Therefore, replacement jet group masks have been defined for 2, 3, 4 and 5 jets remaining. These replacement jet group masks take the responsibility of firing dots away from the defective jets and assigns the responsibility for printing the entire raster line to the remaining functional jets within that jet group.

Defective jets can result from open traces, damaged drop ejection resistors, changed resistance values, or poor contact between the cartridge and the "flex circuit" which provides control signals to the cartridge. As discussed above, defective jets can also result from clogged jet nozzles. All of these errors will cause a jet or jets not to fire, resulting in anomalies in the printed image. The invention may utilize any well-known method or system of detecting defective jets in ink-jet printers. After one or more jets have been determined to be non-functional, a list of the defective jets may be generated, either automatically or via manual input by an operator of the ink jet printer, and stored within a memory of the ink-jet printer. This list of defective jets may then be accessed as necessary to update the print masks of the respective printhead cartridge. In one embodiment, a novel method and system for detecting defective jets in a printhead is utilized. This novel method and system is described in a commonly-owned, concurrently filed patent application entitled, Method and System for Detecting Nonfunctional Elements in an Ink Jet Printer, U.S. application Ser. No.: 09/127,398, now U.S. Pat. No. 6,199,969 the entirety of which is incorporated by reference herein.

Figure 6:
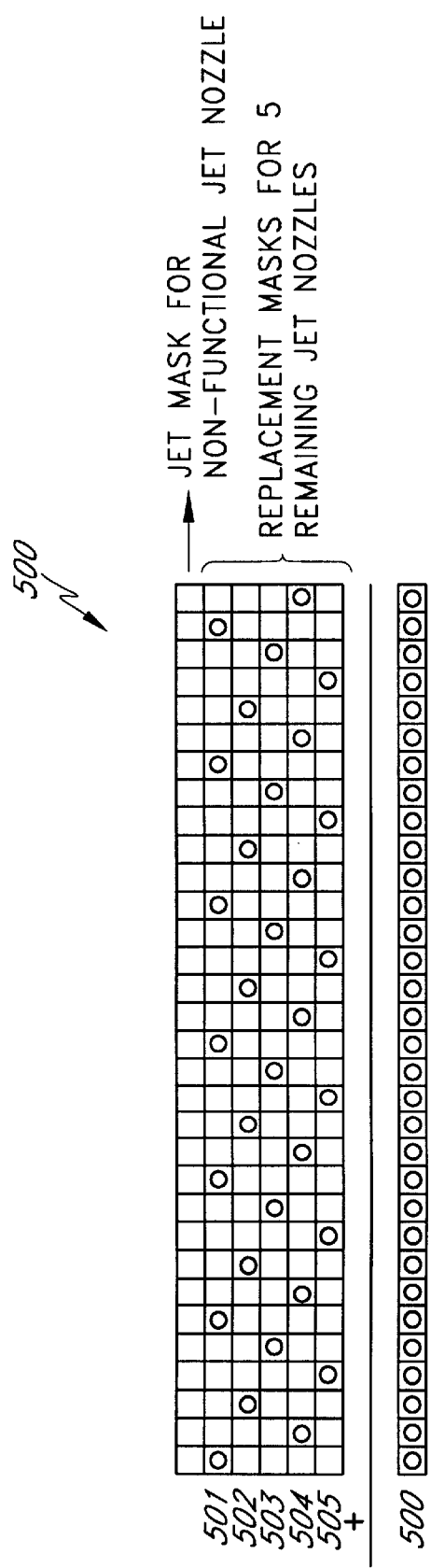
FIG. 6 illustrates a first replacement jet group mask for a jet group which has one defective jet, in accordance with one embodiment of the invention.

Referring to FIG. 6, assuming that one jet in a jet group has been determined to be non-functional, a first replacement jet group mask 500 replaces the original jet group mask of that jet group in order to allocate printing of the entire raster line to the five remaining, functional jets of the jet group. The first replacement jet group mask 500 includes individual replacement jet masks 501–505. When one of six jets in a jet group fails, that jet is shut off, or completely masked, and the original jet masks for the remaining five functional jets of that jet group are replaced by the replacement jet masks 501–505.

For example, if a first jet corresponding to the first print zone has been determined to be non-functional, the first jet in the first print zone is simply turned off, or completely masked, such that it emits no ink, and replacement jet masks 501–505 are assigned to the remaining jets of that jet group. In one embodiment, the replacement jet masks 501–505 are assigned to the remaining jets such that replacement jet masks 501–505 are assigned to the remaining functional jets for that jet group by order of ascending print zone numbers for each remaining functional jet. If the jet corresponding to print zone 1 has failed, then the first functional jet, by order of ascending print zones, is the jet in print zone 2 for that respective jet group. Therefore, replacement mask 501 is assigned to that jet in print zone 2. Similarly, the replacement mask 502 is assigned to the jet in print zone 3 for that respective jet group, and replacement mask 503 is assigned to the jet in print zone 4, and so on.

However, if the non-functional jet was determined to be in print zone 3, for example, the first functional jet would be that corresponding to print zone 1. Therefore, replacement mask 501 would be assigned to the respective jet for that jet group in print zone 1, replacement mask 502 would be assigned to the respective jet in print zone 2, and replacement mask 503 would be assigned to the respective jet in print zone 4, and so on.

As shown in FIG. 6, by replacing the original jet group mask with the first replacement jet group mask 500, when a jet of a jet group is determined to be non-functional, the responsibility of compensating for the non-functional jet is allocated among the remaining functional jets. In this way, a complete raster line 506, having no dots unaccounted for, may still be produced by that jet group.

Figure 7:
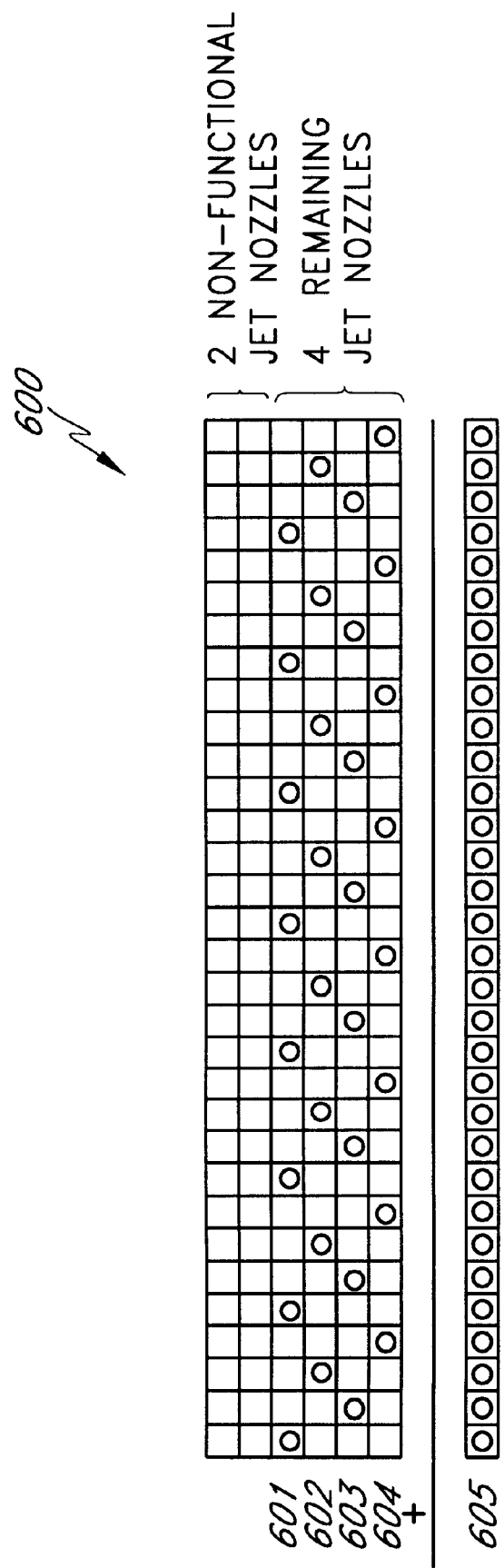
FIG. 7. illustrates a second replacement jet group mask for a first jet group which has two defective jets, in accordance with one embodiment of the invention.

Referring to FIG. 7, a second replacement jet group mask 600 for a jet group having two non-functional jets is illustrated. The second set of replacement masks 600 includes replacement masks 601–604 each corresponding to one of the four remaining jets for that jet group. Similar to the allocation scheme described above with reference to FIG. 6, the replacement masks 601–604 are allocated to the remaining functional jets by order of ascending print zone numbers. For example, if a jet group has non-functional jets in print zones 1 and 4, the first functional jet would be that in print zone 2. Therefore, replacement mask 601 would be assigned to that jet in print zone 2, replacement mask 602 would be assigned to the corresponding jet in print zone 3, replacement mask 603 would be assigned to the corresponding jet in print zone, and replacement mask 604 would be assigned to the corresponding jet in print zone 6. As shown in FIG. 7, the replacement masks 601–604 allow the four remaining functional jets of a jet group having two non-functional jets to print a complete raster line 605, having no dots unaccounted for.

Figure 8:
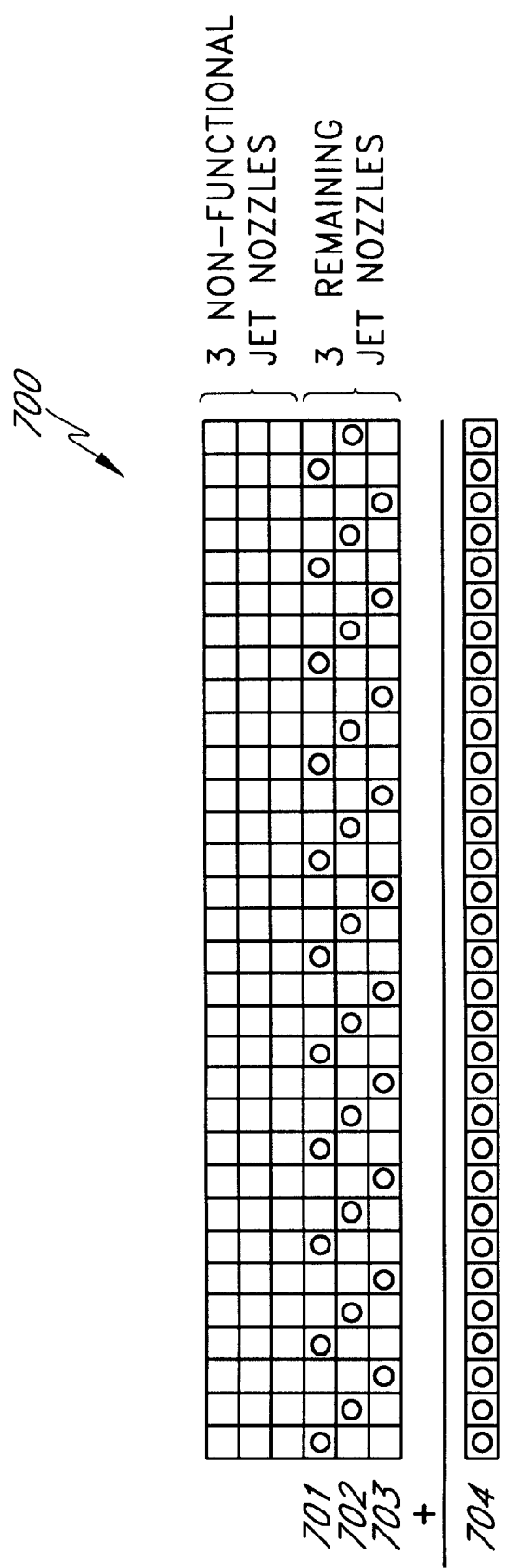
FIG. 8 illustrates a third replacement jet group mask for a jet group which has three defective jets, in accordance with one embodiment of the invention.

FIG. 8 illustrates a third replacement jet group mask 700 for a jet group having three non-functional jets. The third set of replacement masks 700 includes replacement masks 701–703, which are allocated to the three remaining functional jets of a jet group determined to have three non-functional jets. In one embodiment, the replacement masks 701–703 are assigned to the remaining jets by order of ascending print zone numbers, as discussed above with reference to FIGS. 6 and 7. As shown in FIG. 8, the replacement masks 701–703 allow the remaining jets of a jet group, having three non-functional jets, to print a complete raster line 704, with no dots unaccounted for.

Figure 9:
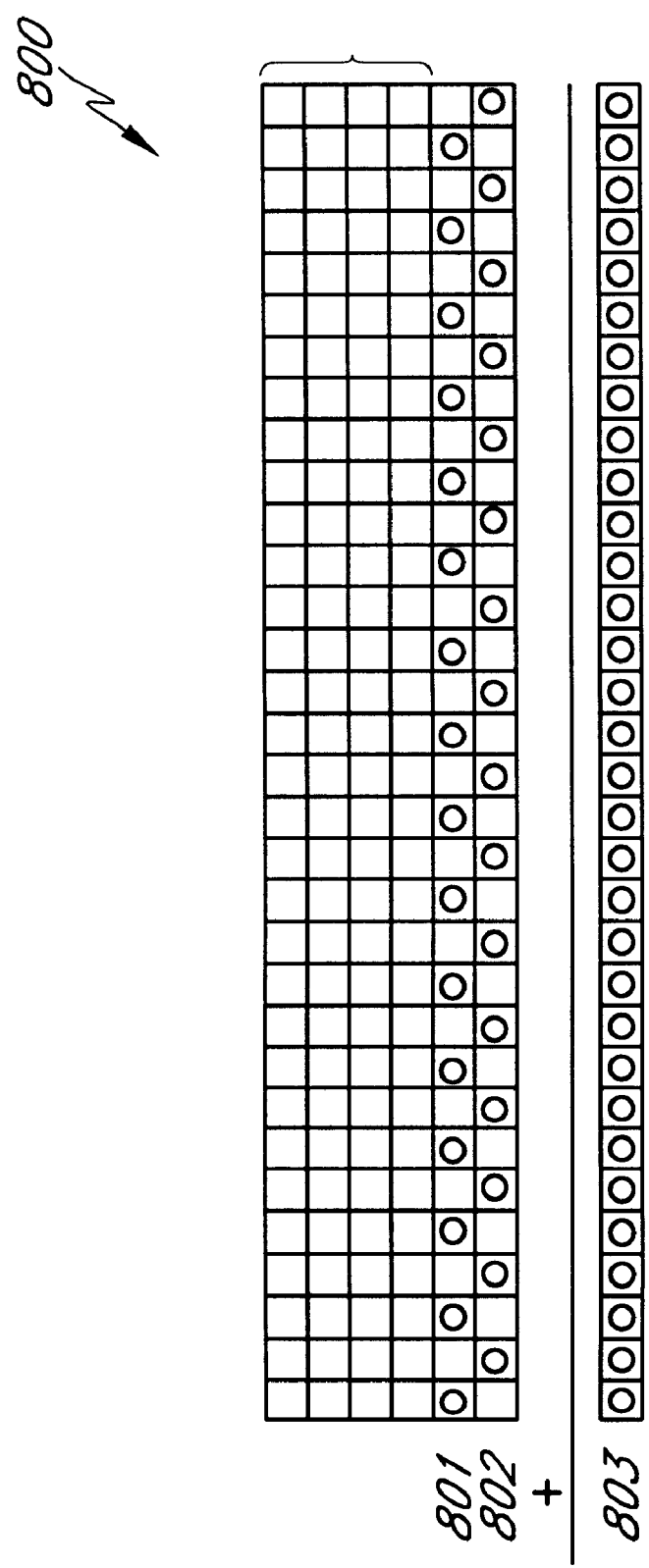
FIG. 9 illustrates a fourth replacement jet group mask for a jet group which has four defective jets, in accordance with one embodiment of the invention.

FIG. 9 illustrates a fourth set of replacement masks 800 for a jet group having four non-functional jets. The fourth set of replacement masks 800 includes replacement masks 801 and 802, which are allocated to the two remaining functional jets of a jet group determined to have four non-functional jets. In one embodiment, the replacement masks 801 and 802 are assigned to the remaining jets by order of ascending print zone numbers, as discussed above with reference to FIGS. 6, 7 and 8. As shown in FIG. 9, the replacement masks 801 and 802 allow the remaining jets of a jet group, having four non-functional jets, to print a complete raster line 803, with no dots unaccounted for.

In order minimize coalescence and to maintain full speed printing, horizontally adjacent dots are avoided in the design of all the replacement jet masks. For this reason, at least two jets in each jet group should remain functional for the above-described replacement scheme to avoid the simultaneous printing of horizontally adjacent dots. As described above, the simultaneous printing of adjacent dots often results in coalescence and a degradation in printing quality. Therefore, in one embodiment, if there are less than two functioning jets in any jet group, the operator is instructed to use a print mode with more passes or to replace the print cartridge.

Figure 10:
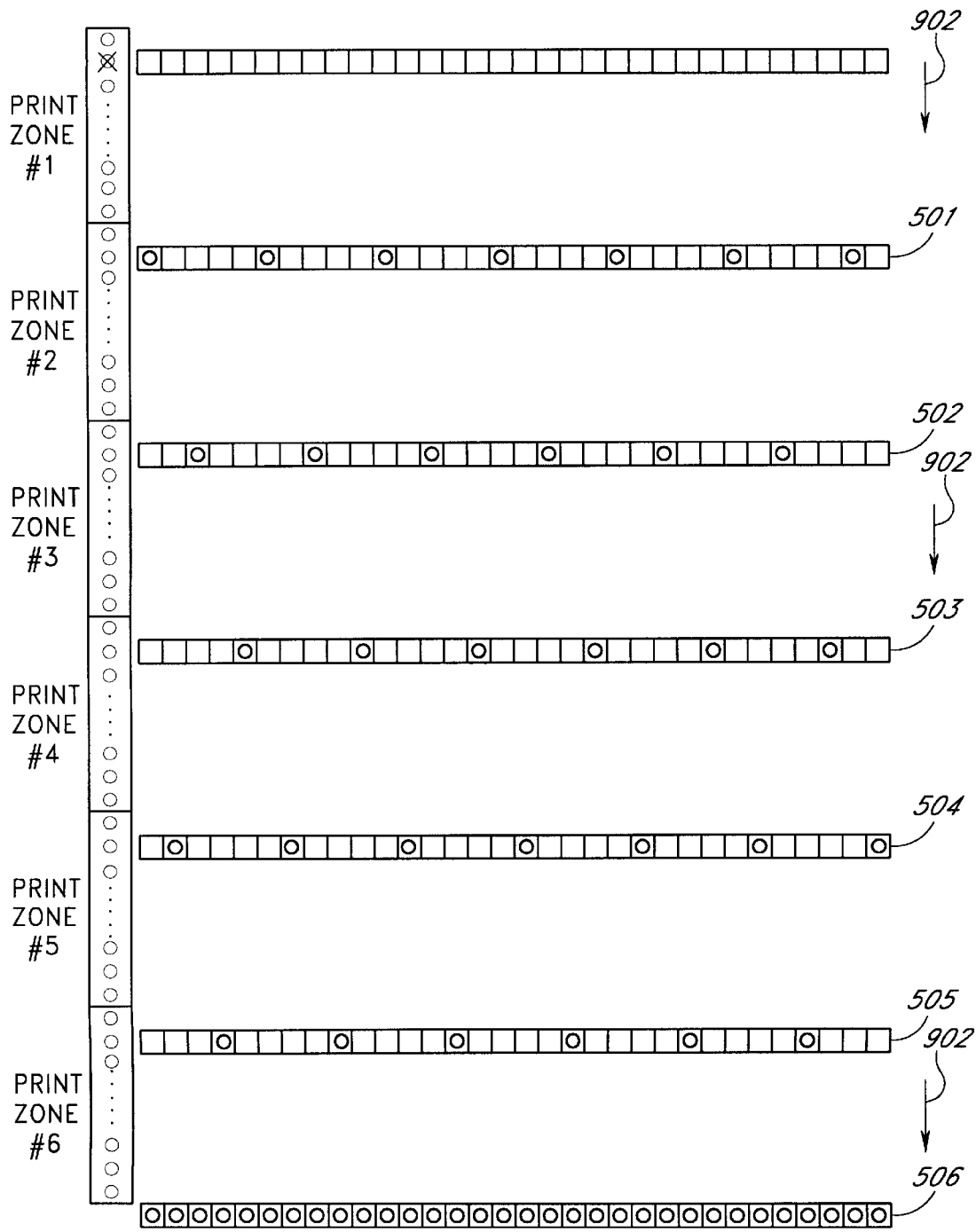
FIG. 10 illustrates the correlation between each of the six print zones and each replacement jet mask of the first replacement jet group mask of FIG. 5.

FIG. 10 illustrates the replacement masks 501–505 of the first replacement jet group mask 500 assigned to the remaining jets of a jet group having one non-functional jet, each remaining jet being in a respective print zone. As shown in FIG. 9, the defective, or non-functional, jet is located in print zone 1. Therefore, the jet in print zone 1 is completely masked, or turned off, such that no dots are fired onto a respective raster line of a recording medium in print zone 1. As the recording medium (e.g., a sheet of paper) advances under the printhead in the direction of arrows 902, the raster line advances to the next print zone and the next jet in the respective jet group may print dots on the raster line in accordance with the replacement jet mask 501. As the recording medium continues to advance in the direction of the arrows 902, the raster line successively passes through each of the print zones and the successive jets of the respective jet group print dots on the raster line in accordance with their respective replacement masks 501–505. After the raster line has passed through each of the respective print zones, each dot, or designated printing area, on the raster line is accounted for, as shown by the completed raster line 506.

Figure 11B:
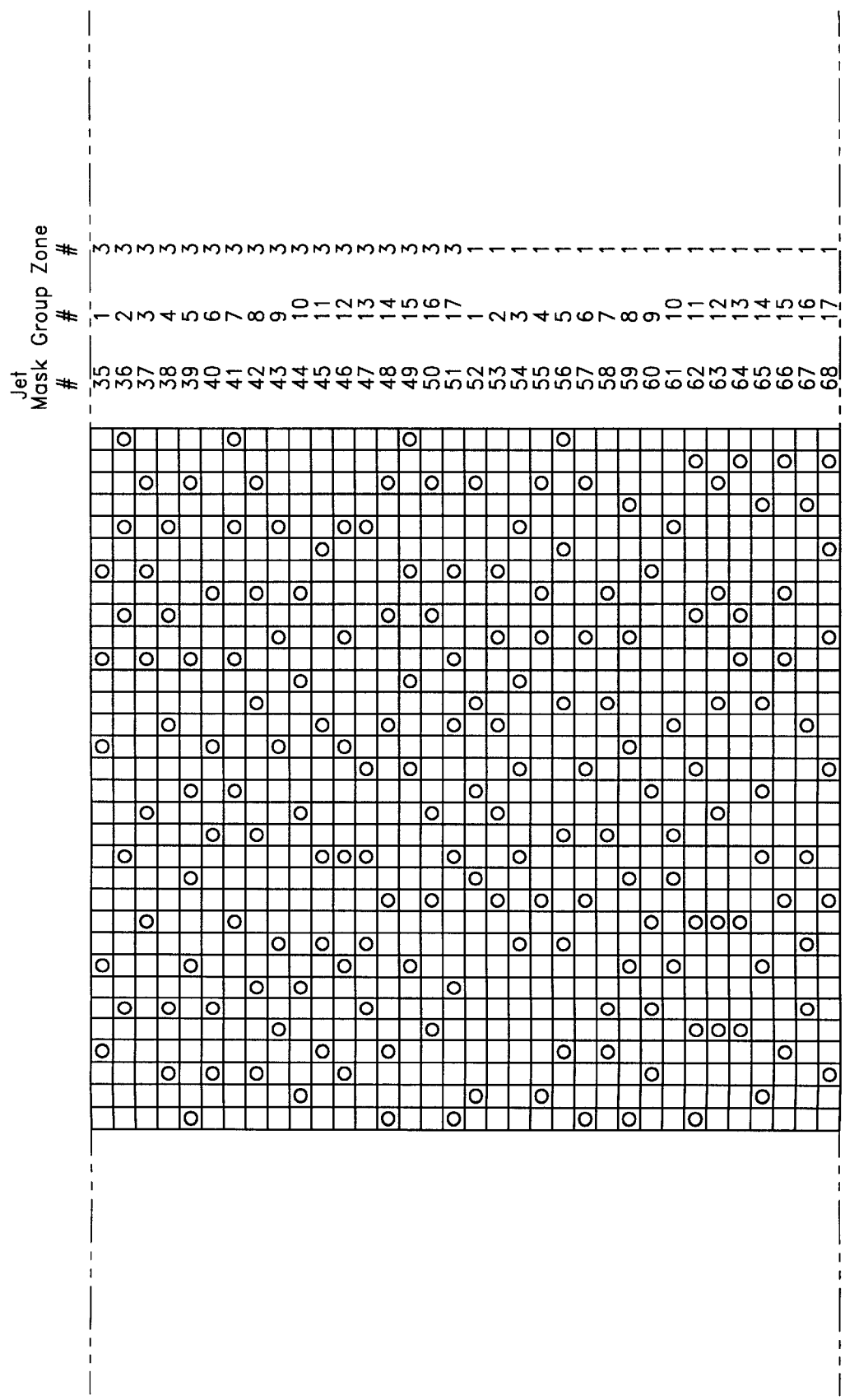
FIG. 11 illustrates a portion of a print mask when jet 12 in jet group 12 is determined to be non-functional and jet group mask 12 has been replaced by the first replacement jet group mask of FIG. 6.
Figure 11C:
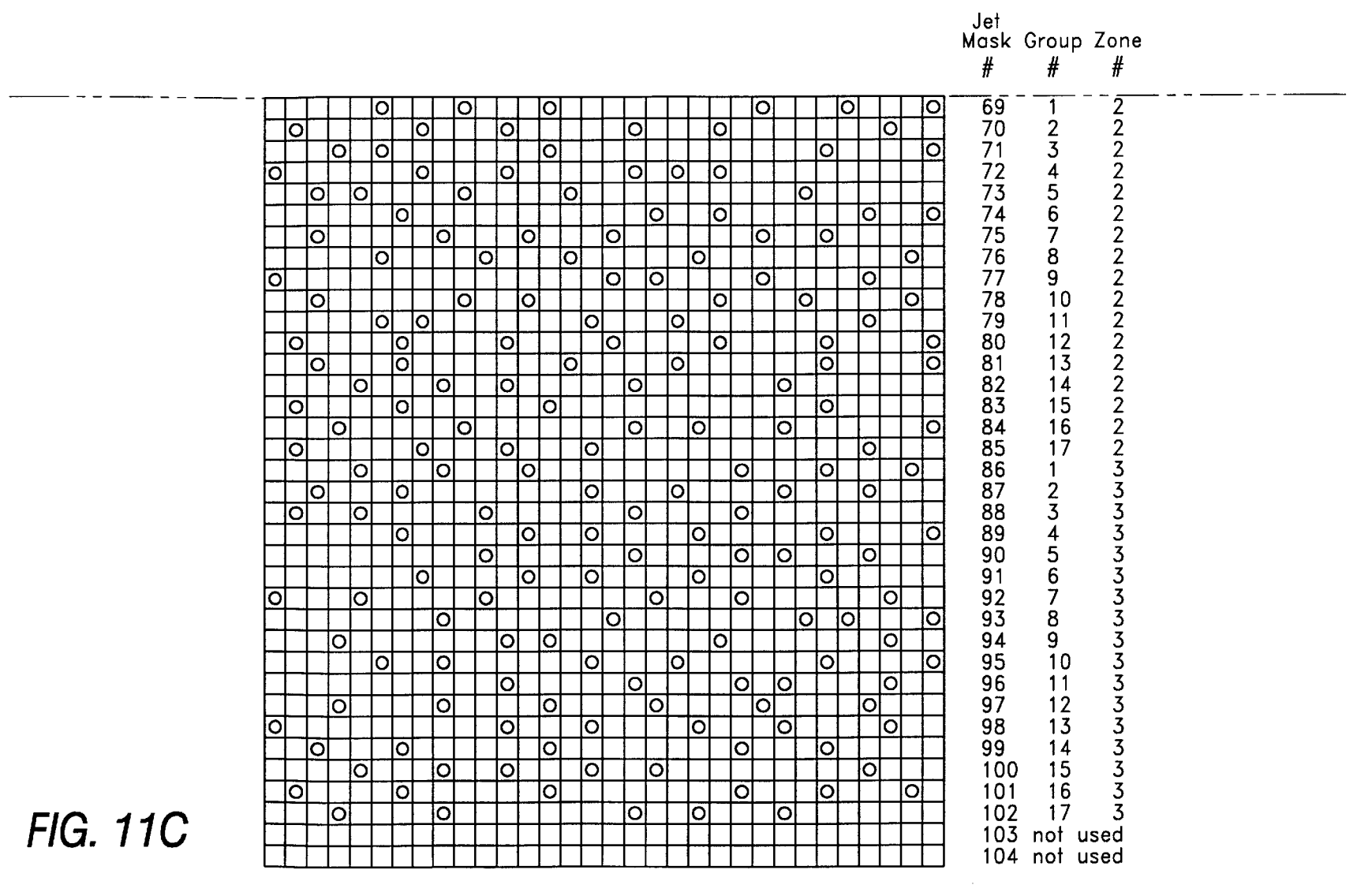

FIG. 11 shows a portion of a print mask having the first replacement jet group mask 500 of FIG. 6 assigned to jet group 12 because jet 12 of jet group 12 has been determined to be non-functional. Note that jet 12, in print zone 1, of jet group 12, is completely masked and, therefore, not responsible for printing any dots on its respective raster line. The remaining jets 29, 46, 63, 80 and 97 of jet group 12 have been assigned replacement masks 501, 502, 503, 504 and 505 (FIG. 6), respectively, so as to compensate for the non-functional jet 12.

FIG. 12 illustrates adjacent swaths of a recording medium which have completed one or more stages of a six-zone printing process, with the first replacement jet group mask 500 of FIG. 6 assigned to jet group 12. Note that raster line 12, corresponding to the non-functional jet 12, in print zone 1, does not have any dots printed on it. However, as this raster line advances through each of the successive stages, it will be completely "filled in" with dots. As shown in FIG. 12, after raster line 12 has completed printing in print zone 6, all of the dots of the raster line are filled in.

In FIG. 12, the configuration of dots on the recording medium represents all the dots which may be printed in a given print zone plus all previous print zones. In other words, in the example shown, the image to be printed on the recording medium is a solid block of ink covering the entire printable surface area, otherwise referred to as a color fill. As shown in FIG. 12, each dot is within a square box which represents the area on the recording medium W which is intended to be covered by the dot of ink. However, these square boxes are illustrated merely for the purpose of distinguishing the different areas on the recording medium and are not necessarily visible on the actual recording medium. Furthermore, the dots printed on the recording medium may have overlapping areas such that there are no spaces between adjacent dots if a solid image is desired.

For a given number of non-functional jets in a jet group, the same set of replacement masks, corresponding to that number of non-functional jets, is used regardless of which jet in the jet group is identified as defective. As shown in FIG. 11, when replacement masks are applied to the overall default print mask for the entire printhead, some vertical adjacencies will occur. The occurrence of these vertical adjacencies is infrequent and results in minimal quality degradation.

Figure 13:
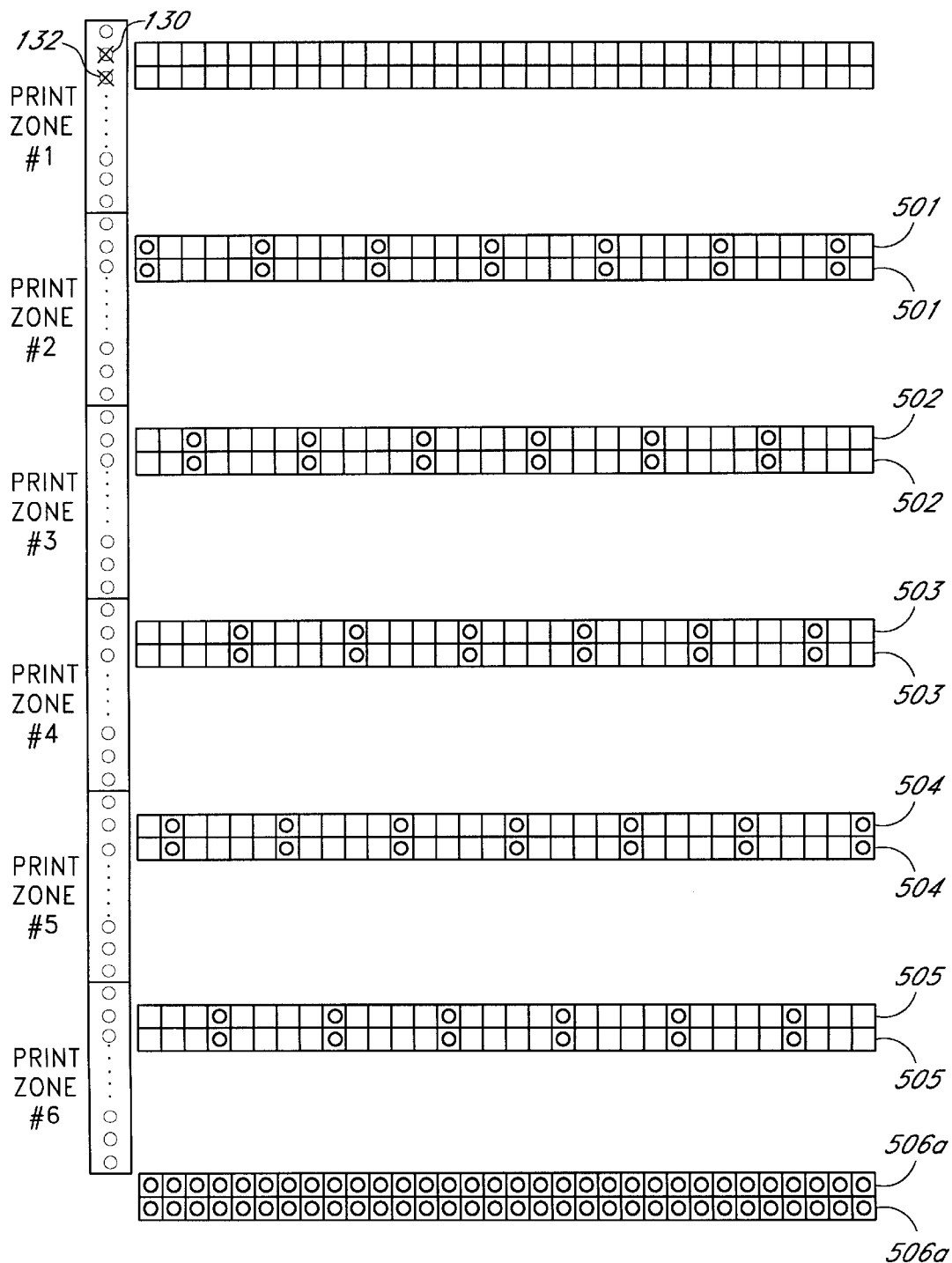
FIG. 13 illustrates identical replacement jet masks assigned to adjacent jets within each print zone.

However, if jets, in adjacent jet groups, are identified as defective, identical replacement jet masks would be used for adjacent jets in print zones which contain the remaining functional jets of each of the adjacent jet groups. FIG. 13 illustrates the use of identical replacement jet masks for adjacent jet groups each having one defective jet. The first set of replacement jet masks 500 of FIG. 6 is used for each of the adjacent jet groups. As shown in FIG. 13, adjacent remaining functional jets for both jet groups would produce a significant number of vertically adjacent dots within each print zone. This results in a significant increase in coalescence and, consequently, significant print quality degradation.

In order to avoid using identical replacement masks for adjacent jets in a print zone, a rotation scheme is used for the placement of the replacement masks. For example, if a jet fails in jet group 1, then the replacement jet masks 501–505 (FIG. 6) are successively applied to the remaining functional jets of jet group 1 in the order 501, 502, 503, 504 and 505. Each replacement mask 501–505 is assigned to its respective jet by order of ascending print zone number, as described above. If a jet also fails in jet group 2, the replacement masks 501–505 are rotated such that they are applied to the remaining functional jets of jet group 2 in the order 502, 503, 504, 505 and then 501. This rotation process is repeated each time another jet in an another adjacent jet group, e.g., jet group 3, is determined to be non-functional. The next rotation would result in the replacement masks being applied in the order 503, 504, 505, 501 and then 502.

Figure 14:
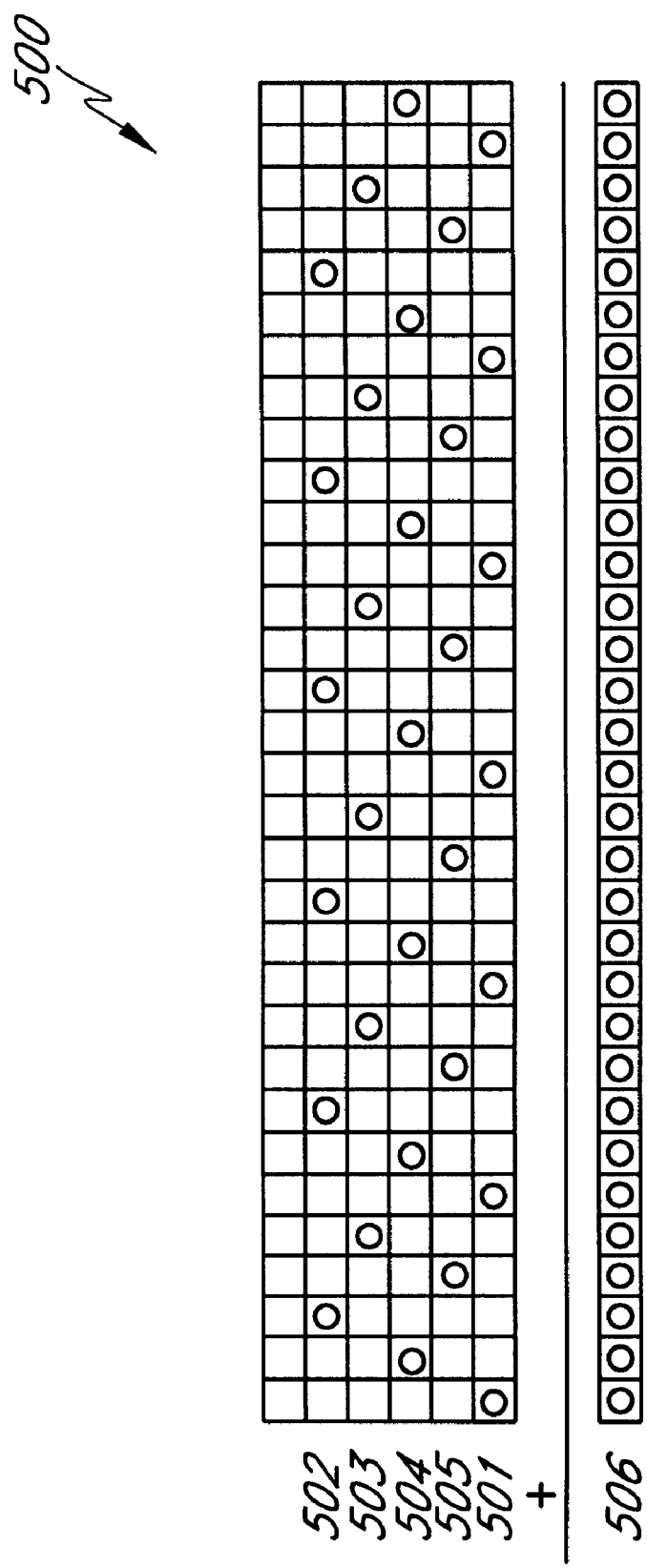
FIG. 14 illustrates the first replacement jet group mask of FIG. 6, having its individual jet masks rotated in a round robin fashion to be utilized on a second jet group, adjacent to the first jet group.

FIG. 14 illustrates the first set of replacement masks 500 after its replacement masks 501–505 have been rotated once such that the order that the replacement masks 501–505 are applied to the remaining functional jets of a jet group is now 502, 503, 504, 505 and then back to 501. Note that replacement mask 502 is now the first one which is applied to the remaining functional jet in the lowest print zone, replacement mask 503 is applied to the functional jet in the next lowest print zone and so on. Replacement mask 501 is now the last replacement mask to be applied.

Figure 15:
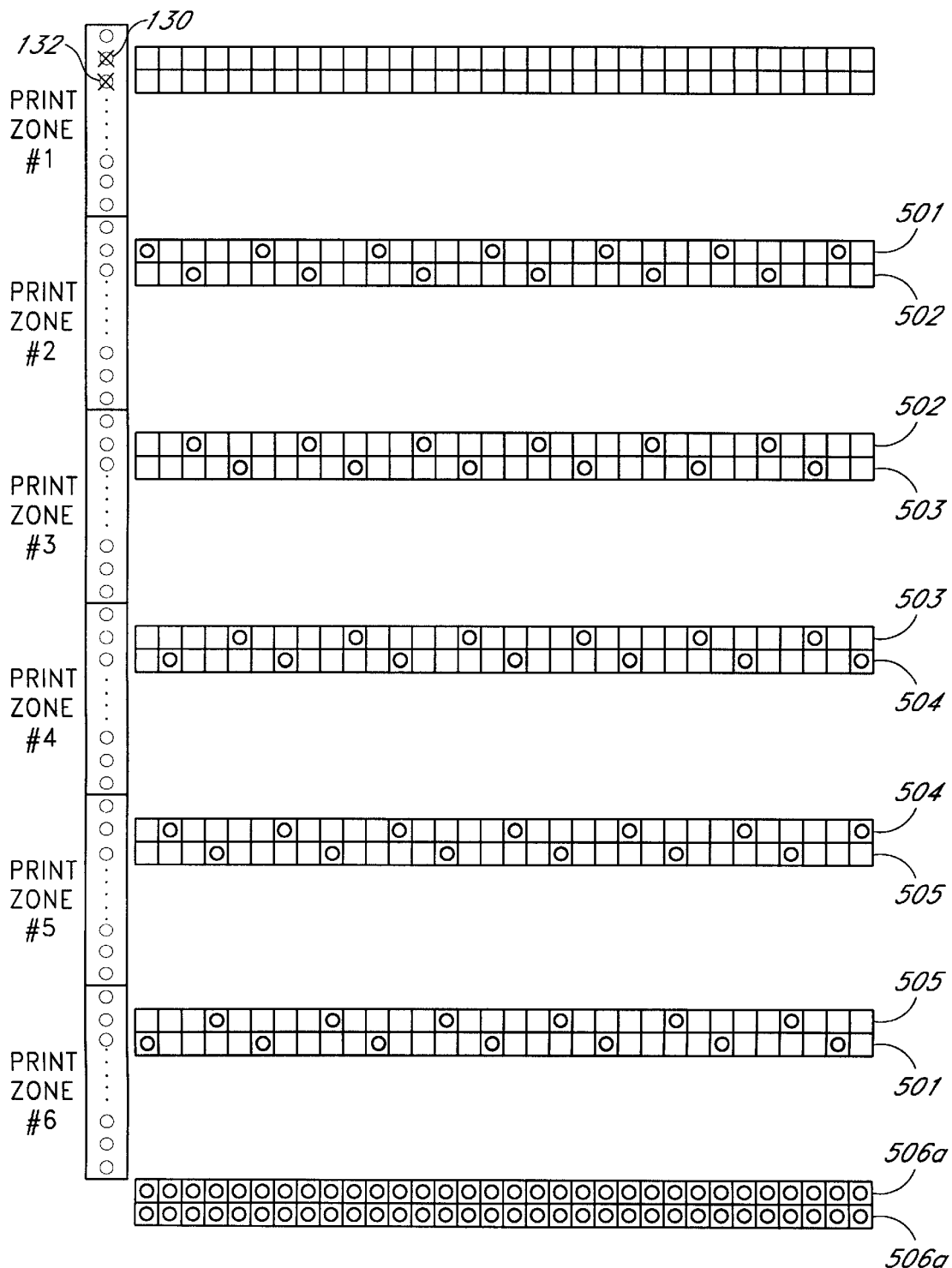
FIG. 15 illustrates the first replacement jet group mask of FIG. 6 assigned to a first jet group and the rotated version of the first replacement jet group mask as shown in FIG. 14, assigned to a second jet group, adjacent the first jet group, in accordance with one embodiment of the invention.

By rotating the order of the replacement masks when there are non-functional jets in adjacent jet groups, vertical adjacencies are minimized and print quality is maximized even when there are many defective jets in a print cartridge. Referring to FIG. 15, a first jet 130 of a first jet group is non-functional and a second jet 132 of a second, adjacent jet group is also non-functional. The replacement jet masks 501–505 are applied to the adjacent jet groups using the rotation scheme described above. In print zone 2, replacement mask 501 is applied to a first remaining functional jet of the first jet group, while replacement mask 502 is applied to a second remaining functional jet, adjacent to the first remaining jet, of the second jet group. Thus, there are no vertical adjacencies between the dots printed by the remaining functional jets in print zone 1. Similarly, in each of the other print zones 3–6 there are no identical replacement masks for adjacent jets, and hence, no vertical adjacencies.

If new defective jets are detected in the middle of a plot, a firmware algorithm, which updates one print zone of the print mask per pass of the printhead, allows for the smooth transition to open jet compensation. Print zone 1 always prints on an unprinted swath of the recording media. Print zone 2 always overprints the region printed by zone 1 and must use jet masks that correspond to the ones used by zone 1 in the previous pass of the printhead, etc. If a new defective jet is detected in the middle of printing job, only the jet masks corresponding to print zone 1 are updated for the next pass of the printhead. After completion of that pass, the jet masks corresponding to print zone 2 are updated but the jet masks corresponding to the remaining zones are left unchanged. This process continues until all the zones have been successively updated to the new masks in order of ascending print zone numbers. In this way, a corresponding raster line which has been successfully printed in a print zone, prior to the failure of the defective jet, completes its subsequent stages in any subsequent print zones in accordance with the original jet masks for the respective jet group responsible for printing that raster line.

As described above, a method and system is provided having significant advantages and features over the prior art. In accordance with the invention, if one or more ink jets in a jet group fails, the one or more failed jets may be compensated for by the remaining jets in a failed jet's respective jet group. This is accomplished by assigning replacement jet masks to the remaining functional jets within each jet group having one or more failed jets such that the remaining functional jets compensate for the failed jet(s) within their respective jet groups. This method and system does not utilize auxiliary jets which are idle during times of normal operation. Therefore, the resources of the printhead are maximized.

Furthermore, the method and system of the invention allows the multi-pass printing method to reduce or eliminate coalescence of printed dots by following a compensation scheme which avoids the printing of vertically and horizontally adjacent dots during a single pass of the printhead over the recording medium. If adjacent jets are non-functional, then the order of assignment of the replacement masks to the remaining functional jets of the second jet group is rotated such that adjacent functional jets do not have identical replacement masks. In this way, vertical adjacencies are minimized.

Finally, as described above, if one or more defective jets are detected during the printing process, the method and system of the invention successively updates the portions of the print mask corresponding to only one print zone at a time. For example, if a defective jet is detected during printing, then prior to the next pass of the printhead over the recording medium, the jet masks corresponding to print zone 1 are updated and the printhead is then allowed to make another pass over the recording medium. Prior to the next pass, the jet masks corresponding to print zone 2 are updated, and so on. In this way, if a defective or nonfunctional jet is detected during the middle of a printing job, a smooth transition from the original jet group mask to the replacement jet group masked is achieved.

The invention may be embodied in other specific forms without departing from its spirit or essential characteristics. The described embodiments are to be considered in all respect only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. An ink-jet printer comprising a printhead having a plurality of print zones, wherein each print zone has a plurality of ink jets such that each ink jet is configured to print dots on a recording medium in accordance with a print mask, wherein said plurality of ink jets comprises a plurality of jet groups such that each jet group has at least one ink jet corresponding to each print zone, wherein each jet group is responsible for printing dots on a respective raster line of the recording medium, wherein when an ink jet in a jet group is detected as being non-functional, at least a portion of the print mask is replaced with a replacement print mask such that one or more of the remaining ink jets in that jet group compensates for the non-functional ink jet, and wherein the replacement print mask avoids the simultaneous printing of horizontally adjacent dots on the respective raster line.

2. The printer of claim 1 wherein:
said print mask comprises a plurality of jet group masks, each jet group mask corresponding to a respective one of said plurality of jet groups, each jet group mask having a plurality of jet masks, each jet mask corresponding to a respective ink jet in a respective jet group; and said replacement print mask comprises a replacement jet group mask which replaces the jet group mask for a jet group having one or more non-functional ink jets, wherein the replacement jet group mask allocates the printing of dots to the remaining functional ink jets of the jet group having one or more non-functional ink jets so as to compensate for the one or more non-functional ink jets.

3. The printer of claim 2 wherein said replacement jet group mask comprises a plurality of replacement jet masks, each replacement jet mask corresponding to a respective ink jet in a respective jet group having one or more non-functional ink jets, and wherein the plurality of replacement jet masks allocate the printing of dots to the remaining functional ink jets in the respective jet group so as to compensate for the one or more non-functional ink jets in that jet group.

* * * * *